United States Patent
Hiraoka et al.

(10) Patent No.: US 9,750,233 B2
(45) Date of Patent: Sep. 5, 2017

(54) LINE ROLLER UNIT AND FISHING LINE GUIDE MECHANISM

(71) Applicant: Shimano Inc., Sakai-ku, Sakai, Osaka (JP)

(72) Inventors: Hirokazu Hiraoka, Sakai (JP); Hirokazu Hirayama, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 341 days.

(21) Appl. No.: 14/719,227

(22) Filed: May 21, 2015

(65) Prior Publication Data

US 2016/0150769 A1 Jun. 2, 2016

(30) Foreign Application Priority Data

Dec. 2, 2014 (JP) .................................. 2014-243743

(51) Int. Cl.
*A01K 89/01* (2006.01)

(52) U.S. Cl.
CPC .... *A01K 89/01081* (2015.05); *A01K 89/0108* (2013.01); *A01K 89/011221* (2015.05)

(58) Field of Classification Search
CPC .............. A01K 89/01; A01K 89/01081; A01K 89/011221; A01K 89/011223
See application file for complete search history.

(56) References Cited

U.S. PATENT DOCUMENTS

| | | | |
|---|---|---|---|
| 9,363,987 B2 | 6/2016 | Hiraoka | |
| 2012/0048981 A1* | 3/2012 | Ohara | A01K 89/0108 242/230 |
| 2015/0115087 A1* | 4/2015 | Ohara | F16C 32/0406 242/223 |
| 2015/0216155 A1* | 8/2015 | Matsuda | A01K 89/0108 242/321 |

FOREIGN PATENT DOCUMENTS

| | | |
|---|---|---|
| JP | 2011-188764 A | 9/2011 |
| JP | 2012-44946 A | 3/2012 |
| JP | 2013-000097 A | 1/2013 |
| JP | 2013-172658 A | 9/2013 |
| JP | 2014-121339 A | 7/2014 |

OTHER PUBLICATIONS

Extended European Search Report in EP 15180890.4-1655 dated May 2, 2016.

* cited by examiner

*Primary Examiner* — Emmanuel M Marcelo
(74) *Attorney, Agent, or Firm* — Jeffer Mangels; Butler & Mitchell LLP; Brennan C. Swain, Esq.

(57) ABSTRACT

The present invention is a line roller unit that includes a line roller, a bearing, a cylindrical member, and a first magnetic seal. The line roller possesses a guider on its periphery surface that guides a fishing line. The bearing is set up on the inner circumference of the line roller, with the cylindrical member possessing a holding part that holds bearing. The cylindrical member is set up on the inner circumference of bearing. The first magnetic seal possesses both a first magnet and a first holding member that holds the first magnet, and the first magnetic seal forms the first magnetic circuit for holding the magnetic liquid at the space between the cylindrical member. The first magnetic seal is set up on the line roller.

20 Claims, 6 Drawing Sheets

LINE ROLLER UNIT AND FISHING LINE GUIDE MECHANISM

FIELD OF THE INVENTION

The present invention concerns a line roller unit and a fishing line guide mechanism.

BACKGROUND OF THE INVENTION

Many spinning reels comprise a spool, a rotor with a pair of rotor arms and the fishing line guide mechanism (the so-called bail arm) that is swingably connected to the front of the pair of rotor arms. The line-guiding mechanism guides the fishing line to the spool. The fishing line mechanism comprises a bail, a pair of bail support members supporting the bail at both ends and a line roller.

Generally, a line roller is supported by a shaft member by way of a bearing. When dust or water gets into this bearing, the line roller cannot rotate smoothly. To prevent this, the line roller has a magnetic sealing mechanism like the one described in, for example, Japanese Published Unexamined Application No. 2013-000097, the entirety of which is incorporated by reference in its entirety.

With regard to the abovementioned line roller, the magnetic seal must decompose when said line roller is taken out, leading to handling difficulties.

These issues are resolved by the present invention with the provision of a line roller unit that is easy to use as well as the fishing line guide mechanism that uses this.

SUMMARY OF THE PREFERRED EMBODIMENTS

In accordance with a first aspect of the present invention there is provided a line roller unit for a fishing line guide mechanism that includes a shaft member, a cylindrical member positioned on the shaft member that includes a holding unit defined therein, a bearing, at least a portion thereof that is positioned in the holding unit, a line roller that includes a central opening defined therethrough, and a a first magnetic seal positioned within the central opening and between an inner diameter of the line roller and the cylindrical member. The bearing is positioned within the central opening such that the line roller can rotate about the shaft member and the cylindrical member. The first magnetic seal includes a first magnet and a first holding member and the first magnetic seal forms a first magnetic circuit for holding a first magnetic fluid positioned in a space between the cylindrical member and the first holding member.

In a preferred embodiment, the cylindrical member includes a first cylindrical part having an outer diameter that partially defines the holding unit and a second cylindrical part having an outer diameter that is larger than the outer diameter of the first cylindrical part. The first and second cylindrical parts define a first step portion. Preferably, the cylindrical member also includes a third cylindrical part having an outer diameter that is larger than the outer diameter of the first cylindrical part. The second and third cylindrical parts are positioned on opposite sides of the first cylindrical part, and the first and third cylindrical parts define a second step portion.

In a preferred embodiment, the bearing comprises an outer race, an inner race and a plurality of ball bearings positioned between the inner and outer races. The inner race is positioned in the holding unit and between the first and second step portions. Preferably, the first and second cylindrical parts are unitary, and the third cylindrical part is not unitary with the first cylindrical part. In a preferred embodiment, the first magnetic circuit is formed between the second cylindrical part and the first holding member.

In a preferred embodiment, the line roller unit includes a second magnetic seal positioned within the central opening and between the inner diameter of the line roller and the cylindrical member. The second magnetic seal includes a second magnet and a second holding member and forms a second magnetic circuit for holding a second magnetic fluid positioned in a space between the cylindrical member and the second holding member. In a preferred embodiment, the line roller unit includes first and second bearings, and the cylindrical member includes a fourth cylindrical part positioned between the first and second bearings and on an outer diameter of the first cylindrical part. Preferably, the fourth cylindrical part is not unitary with the first cylindrical part.

In a preferred embodiment, the inner diameter of the line roller includes first and second inner diameter portions with a third inner diameter portion positioned therebetween. The third inner diameter portion has a smaller diameter than the first and second inner diameter portions and the first magnetic seal is positioned between the first inner diameter portion and the cylindrical member and the second magnetic seal is positioned between the second inner diameter portion and the cylindrical member.

In accordance with another aspect of the present invention there is provided a line roller unit for a fishing line guide mechanism that includes a shaft member, a cylindrical member positioned on the shaft member, a line roller, and a bearing positioned in a central opening of the cylindrical member such that the line roller can rotate about the shaft member and the cylindrical member. The cylindrical member includes a holding unit defined therein, a first cylindrical part having an outer diameter that partially defines the holding unit, a second cylindrical part having an outer diameter that is larger than the outer diameter of the first cylindrical part, and a third cylindrical part having an outer diameter that is larger than the outer diameter of the first cylindrical part. The first and second cylindrical parts define a first step portion, and the first and third cylindrical parts define a second step portion. The bearing includes an outer race, an inner race and a plurality of ball bearings positioned between the inner and outer races. The inner race is positioned in the holding unit and between the first and second step portions. The line roller unit also includes a first magnetic seal positioned within the central opening and between an inner diameter of the line roller and the cylindrical member. The first magnetic seal includes a first magnet and a first holding member, and forms a first magnetic circuit for holding a first magnetic fluid positioned in a space between the second cylindrical part and the first holding member. The line roller unit also includes a second magnetic seal positioned within the central opening and between an inner diameter of the line roller and the cylindrical member. The second magnetic seal includes a second magnet and a second holding member, and forms a second magnetic circuit for holding a second magnetic fluid positioned in a space between the second cylindrical part and the first holding member. The inner diameter of the line roller includes first and second inner diameter portions with a third inner diameter portion positioned therebetween. The third inner diameter portion has a smaller diameter than the first and second inner diameter portions. The first magnetic seal is positioned between the first inner diameter portion and the second cylindrical part and the second magnetic seal is positioned between the second inner diameter portion and the third cylindrical part.

In accordance with another aspect of the present invention there is provided a line line roller unit for a fishing line guide mechanism that guides a fishing line to a spool of a spinning reel and that includes a line roller, a bearing positioned on an inner circumferential surface of the line roller, a cylindrical member that has a holding unit for holding the bearing and that is positioned on an inner circumferential surface of the bearing, and a first magnetic seal that includes a first magnet and a first holding member that holds the first magnet. The first magnetic seal forms a first magnetic circuit for holding a first magnetic fluid positioned in a space between the cylindrical member and the first holding member.

In a preferred embodiment, the cylindrical member includes a first cylindrical part attached to the inner circumferential surface of the bearing and a second cylindrical part with an outer diameter larger than that of the first cylindrical part. The holding unit contains a first step portion defined by the first cylindrical part and the second cylindrical part, with the first step portion connected to a first side of the bearing. Preferably, the cylindrical member further comprises a third cylindrical part that is configured on the periphery of the first cylindrical part, with the holding unit possessing a second step portion that is defined by the first cylindrical part and the third cylindrical part. The second step portion is connected to a second side of the bearing.

In a preferred embodiment, the bearing comprises an outer race configured to an inner circumference of the line roller, an inner race configured to the periphery of the cylindrical member, and a plurality of ball bearings configured in between the inner and outer races. A first side of the inner race is connected to the first step portion and a second side of the inner race is connected to the second step portion. Preferably, the first magnetic seal forms the first magnetic circuit between the second cylindrical part and the first holding member. In a preferred embodiment, the line guide roller comprises first and second bearings and the cylindrical member further comprises a fourth cylindrical part between the first and second bearings that is configured to a periphery of the first cylindrical part. Preferably, the line roller unit includes a second magnetic seal that comprises a second magnet and a second holding member that maintains the second magnet. The second magnetic seal forms a second magnetic circuit for holding a second magnetic fluid positioned in a space between the cylindrical member and the second holding member.

In accordance with another aspect of the present invention there is provided a fishing line guide mechanism that guides fishing lines to the spool and is configured to be attached to a pair of rotor arms of a rotor of a spinning reel. The fishing line guide mechanism includes a bail, a first bail support member that is configured to be attached to one of the rotor arms and that supports a first edge of the bail, and a shaft member that extends through the space between the first bail support member and the first edge of said bail, a line roller unit is attached to the shaft member.

The line roller unit in connection with a first embodiment of the present invention comprises a fishing line guide mechanism that guides the fishing line to the spool of the spinning reel. This line roller unit is characterized by a line roller, a bearing, a cylindrical member, and first magnetic seal. The line roller possesses on its periphery a guider that guides the fishing line. The bearing is set up in the inner circumference of the line roller. The cylindrical member possesses a holding unit that supports the bearing, and the cylindrical member is set up in the inner circumference of the bearing. The first magnetic seal possesses the first magnet and the first holding unit supporting the first magnet. The first magnetic circuit is formed for the magnetic fluid maintained in the space between the cylindrical member. The first magnetic seal is set up in the line roller.

Based on this configuration, the bearing is supported by the cylindrical member and set up in the inner circumference of the line roller. Thus, the line roller, bearing, cylindrical member, and first magnetic seal come together as a unit, making handling simple.

Preferably, the cylindrical member possesses the first cylinder and second cylinder, with the first cylinder connecting to the inner circumferential surface of the bearing. The second cylinder has an outside diameter larger than that of the first cylinder. The holding unit contains the first step portion that is defined by the first cylinder and the second cylinder, and, based on this configuration, the movement of the bearing in the direction of the shaft is regulated by its attachment to the first step portion.

Preferably, the cylindrical member will have a third cylinder configured to the outer periphery of the first cylinder. The holding unit includes a second step portion defined by the first and third cylinders, with the second step portion connecting to the second edge portion of the bearing. Based on this configuration, the movement of the bearing in the direction of the shaft is regulated by its connection to the second step portion.

Preferably, the bearing will have an outer and inner race as well as a plurality of ball bearings. The outer race is configured to the inner circumference of the line roller, whereas the inner race is configured to the periphery of the cylindrical member, with each ball bearing being configured between the inner and outer races. The first edge portion of the inner race is connected to the first step portion.

Preferably, the second edge portion of the inner race is connected to the second step portion.

Preferably, the first edge portion of the inner race is connected to the first step portion, with the second edge portion of the inner race being connected to the second step portion.

Preferably, the first magnetic seal forms the first magnetic circuit in the space between the second cylinder.

Preferably, the bearing includes both the first and second bearings. The cylindrical member contains a fourth cylinder, with the fourth cylinder configured to the periphery of the first cylinder between the first and second bearing.

Preferably, the line roller unit is further comprised of a second magnetic seal, with the second magnetic seal itself possessing the second magnet and the second holding unit and forming the second magnetic circuit for maintaining the second magnetic fluid between the cylindrical member. The second magnetic seal is set up in the line roller.

The fishing line guide mechanism connected to the second side surface of the present invention is connected to the pair of rotor arms belonging to the rotor of the spinning reel, guiding the fishing line to the spool. Said fishing line guide mechanism is comprised of a bail, the first bail support member, the shaft member, and either of the line roller units.

The first bail support member is connected to one of the rotor arms, supporting the first edge of the bail. The shaft member extends the space between the first bail support and the first edge portion of the bail, with the line roller unit being connected to the shaft member.

The present invention provides an easily handled line roller unit and the fishing line guide mechanism using this unit.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

It will be appreciated that terms such as "front," "back," "top," "bottom," "side," "short," "long," "up," "down," "left," "right" and "below" used herein are merely for ease of description and refer to the orientation of the components as shown in the figures. It should be understood that any orientation of the components described herein is within the scope of the present invention.

Figure 1:
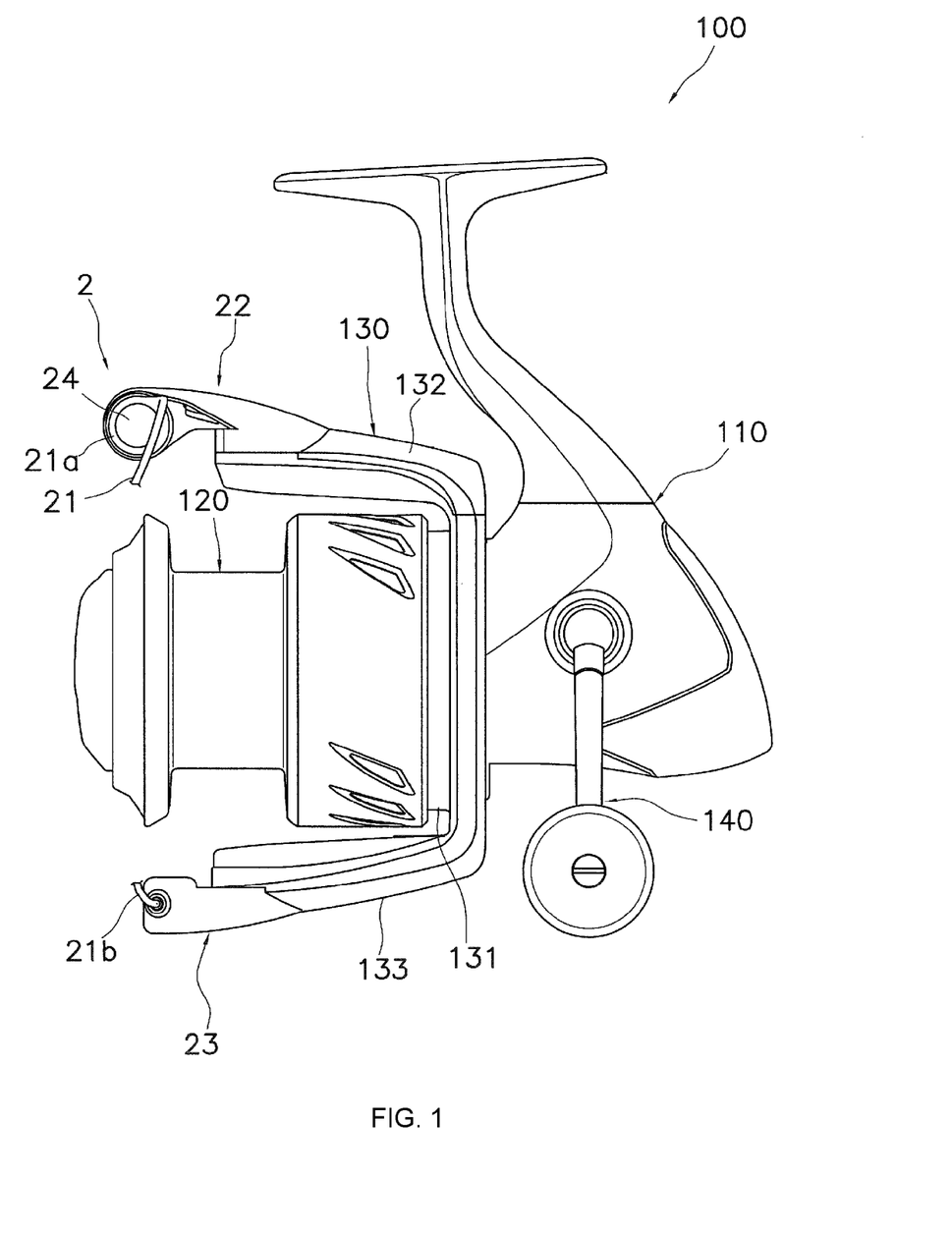
FIG. 1 is a side view of the spinning reel in accordance with a preferred embodiment of the present invention.

The following explains the embodiment of the line roller unit in connection with an embodiment of the present invention and the fishing line guide mechanism that uses this along with figures. FIG. 1 is a side view of a spinning reel 100.

As shown in FIG. 1, spinning reel 100 comprises a reel body 110, a spool 120, a rotor 130, a handle 140 and the fishing reel guide mechanism.

Reel body 110 contains an accommodating space within it, additionally housing various mechanisms. For example, in reel body 110, there is housed a mechanism that rotates rotor 130, while another mechanism moves spool 120 back and forth.

Spool 120 is a member around which the fishing line is wound, with spool 120 having the approximate shape of a cylinder. Rotor 130 is a member that winds the fishing line around spool 120, and when the handle is rotated, spool 120 is moved back and forth in reciprocation. Rotor 130 rotates the spool 120 around a central axis. Additionally, the fishing line guide mechanism that rotates along with rotor 130 guides the fishing line to spool 120.

Specifically, rotor 130 possesses rotor body part 131 as well as first and second rotor arms 132 and 133. First and second rotor arms 132 and 133 extend from the periphery surface of rotor body part 131 towards the front. The first rotor arm 132 and second rotor arm 133 are configured on opposite sides in the circumferential direction of rotor body part 131. Additionally, the fishing line guide mechanism is swingably connected to first rotor arm 132 and second rotor arm 133.

A fishing line mechanism 2 is swingably connected to rotor 130 so that a thread-guide orientation and thread-open orientation can be chosen. Fishing line mechanism 2 comprises a bail 21, a first bail support member 22, a second bail support member 23, a shaft member 24, and a line roller unit 25.

Bail 21 is a stainless steel alloy member in the approximate shape of the letter "U" that is curved along the periphery surface of spool 120 to form a projection. The Bail 21 possesses a first edge 21a and a second edge 21b. When the fishing line guide mechanism 2 returns to a line-guide orientation from an open orientation, bail 21 guides the fishing line to the line roller unit 25 via first edge 21a.

The first bail support member 22 supports first edge 21a of bail 21. Specifically, the first bail support member 22 supports first edge 21a of bail 21 via shaft member 24. The first bail support member 22 is connected to first rotor arm 132.

Specifically, the first bail support member 22 is swingably connected to first rotor arm 132. Additionally, the first bail support member 22 is swingably connected to the outside of the edge of first rotor arm 132.

The second bail support member 23 supports second edge 21b of bail 21b, being swingably connected to second rotor arm 133. Specifically, the second bail support member 23 is swingably connected to the outside edge of second rotor arm 133.

Figure 2:
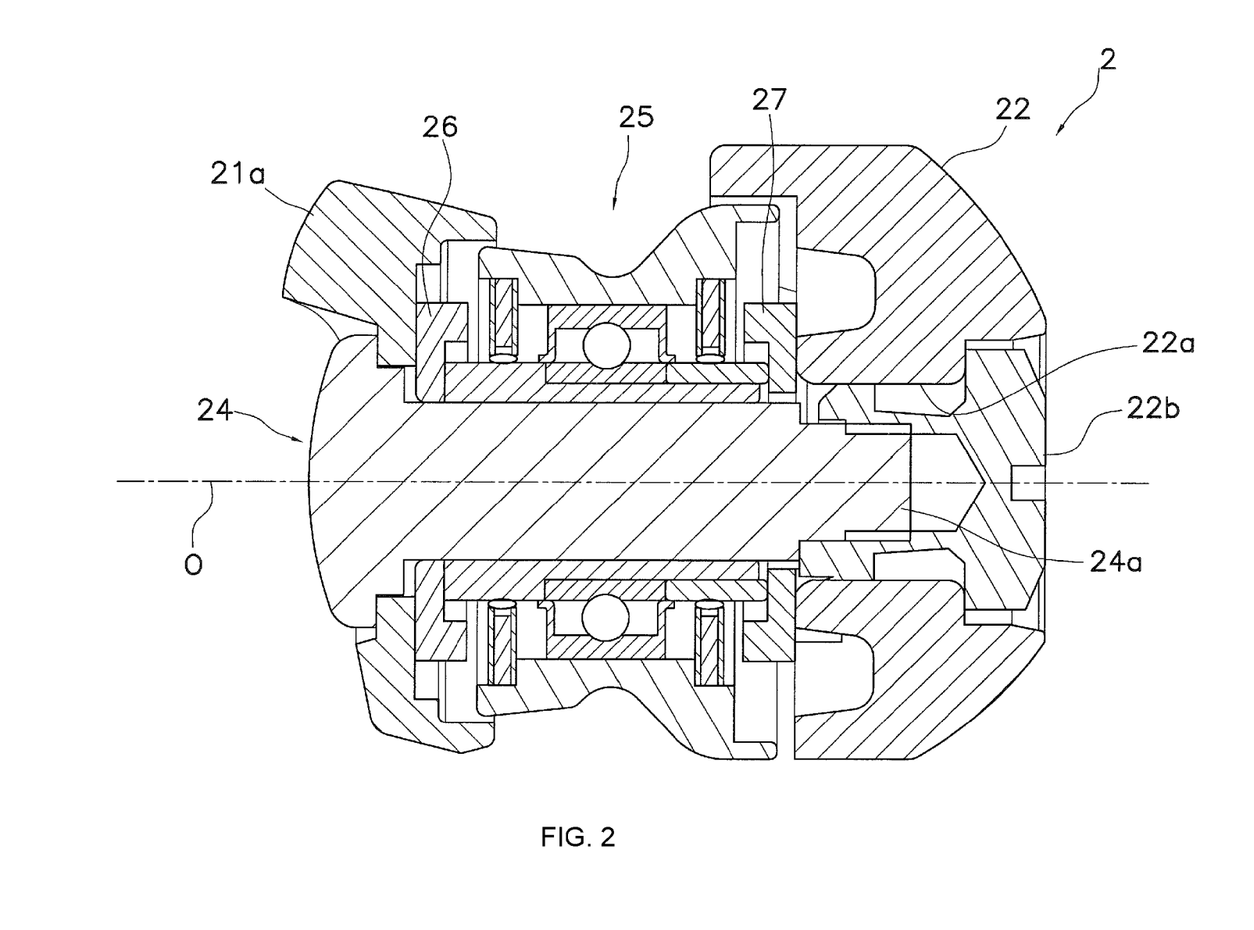
FIG. 2 is a sectional view of the fishing line guide mechanism.

FIG. 2 is a sectional view of fishing line guide mechanism 2. Additionally, as is explained below, the axis direction refers to the direction extended by the rotation shaft of line roller unit 25. In other words, it is in reference to the direction extended by shaft member 24. Specifically, the left/right direction as seen in FIG. 2 displays the axis direction. Additionally, the radius direction refers to the circular radius direction oriented around the rotation shaft. Furthermore, the circumferential direction refers to the circular circumferential direction centered around the rotation shaft.

As shown in FIG. 2, shaft member 24 extends the space between first bail support member 22 and first edge 21a of bail 21. Specifically, shaft member 24 extends from first edge 21a of bail 21 towards the first bail support member. Additionally, tip edge 24a of shaft member 24 is screwed to nut member 22b, which is housed in through-hole 22a formed in first bail support member 22.

Line roller unit 25 is a member that guides the fishing line to spool 120 of spinning reel 100 and is connected to shaft member 24, being configured to the periphery of shaft member 24.

Line roller unit 25 is configured between first edge 21a of bail 21 and first bail support member 22 in an axial direction. Additionally, the first annular member 26 is configured between line roller unit 25 and first edge 21a of bail 21, with second annular member 27 configured between line roller unit 25 and the first bail support member 22. Both first annular member 26 and second annular member 27 are attached to shaft member 24, making it so that the movement of line roller unit 25 goes in an axial direction.

Figure 3:
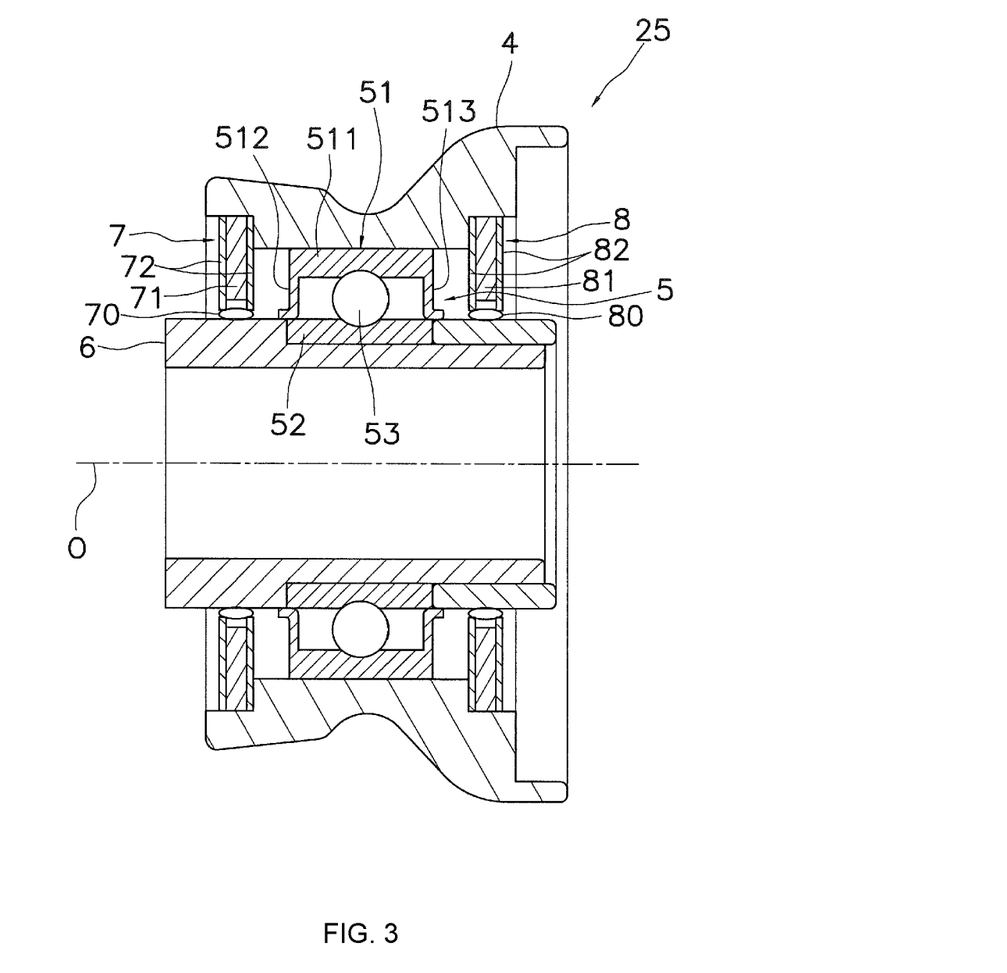
FIG. 3 is a sectional view of the line roller unit.

FIG. 3 is a sectional view of line roller unit 25, and as shown in FIG. 3, line roller 25 comprises a line roller 4, a bearing 5, a cylindrical member 6, a first magnetic seal 7 and a second magnetic seal 8.

Figure 4:
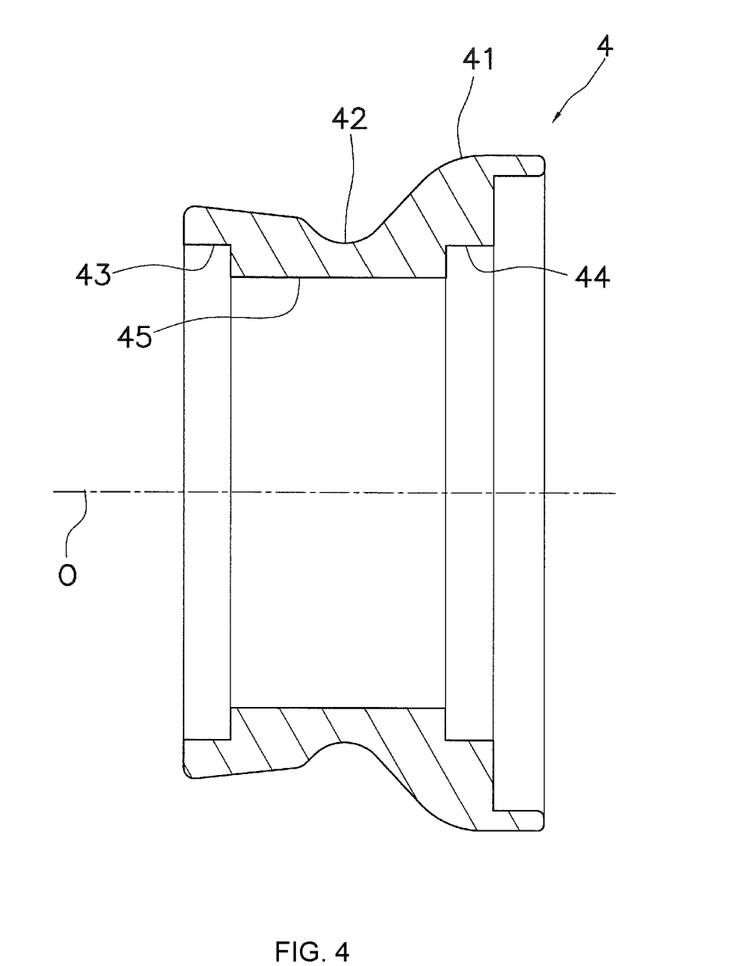
FIG. 4 is a sectional view of the line roller.

FIG. 4 is a sectional view of line roller 4, wherein line roller 4 has on its periphery a surface guider 41 for guiding the fishing line. More specifically, annular groove portion 42, which extends the circumferential direction, is formed guider 41, with guider 41 tilting from both edges to groove portion 42 so that the line is guided to groove 42.

Line roller 4 is in the approximate shape of a cylinder that is made of, for example, metal, though it is not limited to this, as it can be made of stainless steel as well. The inner circumferential surface of line roller 4 possesses a first large-diameter piece 43 and a second large-diameter piece 44, in addition to a small-diameter piece 45. The first large-diameter piece 43 and second large-diameter piece 44 have a diameter larger than small-diameter piece 45. Additionally, the diameter of the first large-diameter piece 43 and second large-diameter piece 44 are approximately the same. The small-diameter piece 45 is configured between first large-diameter piece 43 and second large-diameter piece 44 in an axial direction.

As shown in FIG. 3, bearing 5 is set up in the inner circumference of line roller 4, and more specifically, bearing 5 is fitted to line roller 4, thus making it so that line roller 4 is rotatably supported by cylindrical member 6 by way of bearing 5.

Bearing 5 contains an outer race 51, an inner race 52, and a plurality of ball bearings 53. The outer race 51 is configured on the inner circumference of line roller 4, and is in the shape of a cylinder, being fitted to line roller 4 and moving in conjunction with line roller 4, this in addition to being attached to small-diameter piece 45 of line roller 4.

Outer race 51 contains a cylindrical part 511, a first cover part 512, and a second cover part 513, with cylindrical part 511 being cylindrical and touching the inner circumferential surface of line roller 4.

The first cover part 512 is cylindrical and extends radially inward from the first edge of cylindrical part 511. Additionally, the edge of the inner circumference of first cover part 512 extends in a direction separating from rolling body 53 in an axial direction.

The second cover part 513 is circular and extends radially inward from the second edge of cylindrical part 511, with the inner circumferential surface of second cover part 513 connecting with inner race 52. Furthermore, the edge of the inner circumference extends in a direction separating from rolling body 53 in an axial direction, with both first cover part 512 and second cover part 513 preventing the inside of bearing 5 from being inundated with water.

The inner race 52 is configured to the periphery of cylindrical member 6 and is cylindrical, with cylindrical member 6 being fitted to inner race 52. More specifically, inner race 52 is housed within a later-described holding unit 60 of cylindrical member 6, thus making it so that inner race 52 is maintained within cylindrical member 6.

The ball bearings 53 are configured between outer race 51 and inner race 52. The rolling bodies 53 are configured together in a circumferential direction with space between them. Both outer race 51 and inner race 52 are made of metal, such as stainless steel.

Figure 5:
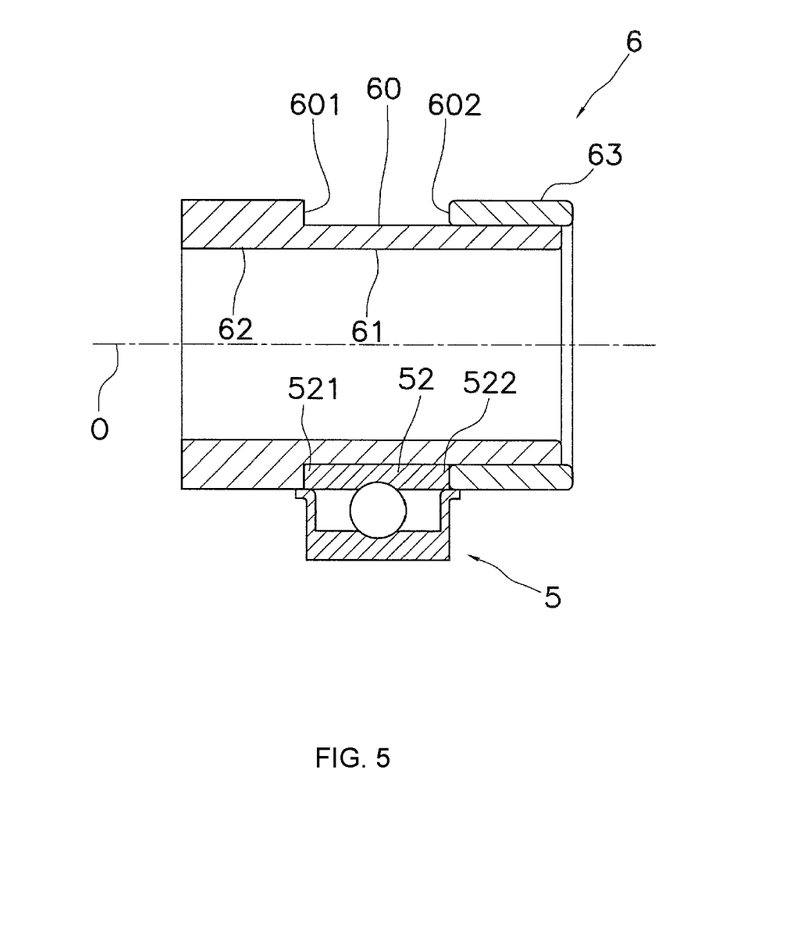
FIG. 5 is a sectional view of the cylindrical member.

Cylindrical member 6 is set up on the inner circumference of bearing 5. FIG. 5 is a sectional view of cylindrical member 6, and additionally, the upper half of FIG. 5 is a sectional view of cylindrical member 6 only, whereas the second half of FIG. 5 displays section part 6 as attached to bearing 5.

As is shown in FIG. 5, cylindrical member 6 possesses holding unit 60, which holds bearing 5, with holding unit 60 itself containing a first step portion 601 and a second step portion 602. Specifically, holding unit 60 is an annular recess extending in a circumferential direction, with a portion of bearing 5 being housed within said holding unit 60. In other words, the inner race 52 of bearing 5 is housed within holding unit 60, thus regulating the radially-oriented movement of bearing 5

Cylindrical member 6 contains a first cylindrical part 61, a second cylindrical part 62, and a third cylindrical part 63. Furthermore, both first cylindrical part 61 and second cylindrical part 62 are formed by one member, whereas third cylindrical part 63 is formed by a member different from that of first cylinder part 61 and second cylindrical part 32.

Both first cylindrical part 61 and second cylindrical part 62 are cylindrical and extend in a circumferential direction. The first cylindrical part 61 is attached to the inner circumference face of bearing 5. The second cylindrical part 62 has an outside diameter larger than that of first cylindrical part 61.

The first cylindrical part 61 and second cylindrical part 62 define first step portion 601. The first step portion 601 is attached to the first edge of bearing 5, and more specifically, is attached to a first edge 521 of inner race 52 belonging to bearing 5. Additionally, the inner circumference of first cylindrical part 61 is the same as the inner circumference of second cylindrical part 62.

The third cylindrical part 63 is configured onto the periphery of first cylindrical part 61. Additionally, third cylindrical part 63 is configured with second cylindrical part 62 with space between them in a radial direction. The inner diameter of third cylindrical part 63 is almost identical to the outer diameter of first cylindrical part 61.

The third cylindrical member 63 has an outer diameter larger than that of first cylindrical part 61, with said first cylindrical part 61 and third cylindrical part 63 defining second step portion 602, said second step portion 602 being connected to the second edge of bearing 5. More specifically, second step portion 602 is connected to second edge 522 of inner race 52 belonging to bearing 5. Additionally, the outer diameter of third cylindrical part 63 is approximately equivalent to the outer diameter of second cylindrical part 62.

As shown in FIG. 3, the first magnetic seal 7 is attached to the inner circumferential surface of line roller 4, or, more specifically, the first magnetic seal 7 is attached to large-diameter piece 43 belonging to line roller 4, with first magnetic seal 7 being configured to form the first magnetic circuit for holding a first magnetic fluid 70 in the space between cylindrical member 6. More specifically, first magnetic seal 7 is configured so as to create a circuit in the space between second cylindrical part 62.

Additionally, the first magnetic seal is configured with cylindrical member 6 with space between them. That is to say, the first magnetic seal 7 is not connected to cylindrical member 6. Additionally, first magnetic fluid 70 is maintained in the space between first magnetic seal 7 and cylindrical member 6. In other words, first magnetic fluid 70 fills the gap between first magnetic seal 7 and cylindrical member 6.

The first magnetic seal 7 contains a first magnet 71 and a first holding member 72, with first magnet 71 being an annular permanent magnet that extends in a circumferential direction.

For example, the first holding member 72 is holding plate pair 72, two plates configured in an axial direction with space between them. Said holding plate pair 72 keep first magnet 71 in place by having said first magnet 71 placed between them. Holding plate pair 72 can, for example, be fitted to a groove formed in large-diameter piece 43 of line roller 4 or can be fastened to large-diameter piece 43 of line roller 4.

The second magnetic seal 8 is attached to the inner circumferential surface of line roller 4, and specifically, second magnetic seal 8 is connected to large-diameter piece 44 of line roller 4, with second magnetic seal 8 being configured so as to form the second magnetic circuit for maintaining a second magnetic fluid 80 in the gap by cylindrical member 6.

Additionally, second magnetic seal 8 is configured with cylindrical member 6 with space between them. That is to say, second magnetic seal 8 is not connected to cylindrical member 6. Additionally, the space between second magnetic seal 8 and cylindrical member 6 holds second magnetic fluid 80, or, in other words, magnetic fluid 80 fills the gap between second magnetic seal 8 and cylindrical member 6.

The second magnetic seal 8 contains a second magnet 81 and a second holding member 82, with second magnet 81 being an annular permanent magnet that extends in a circumferential direction.

For example, second holding member 82 is holding pair plate 82, two plates configured with space between them in an axial direction, with second magnet 8 being held in place by being placed between them. Holding plate pair 82 can, as an example, be fitted to the groove formed in large-diameter piece 44 of line roller 4 or can be adhered to large-diameter 44 of line roller 4.

Line roller unit 25, configured as previously mentioned, allows for the easy handling due to being removable as one whole.

The present invention is not limited to the embodiments as were explained above, and various modifications can be made so long as they do not negatively impact the purpose of the present invention.

Figure 6:
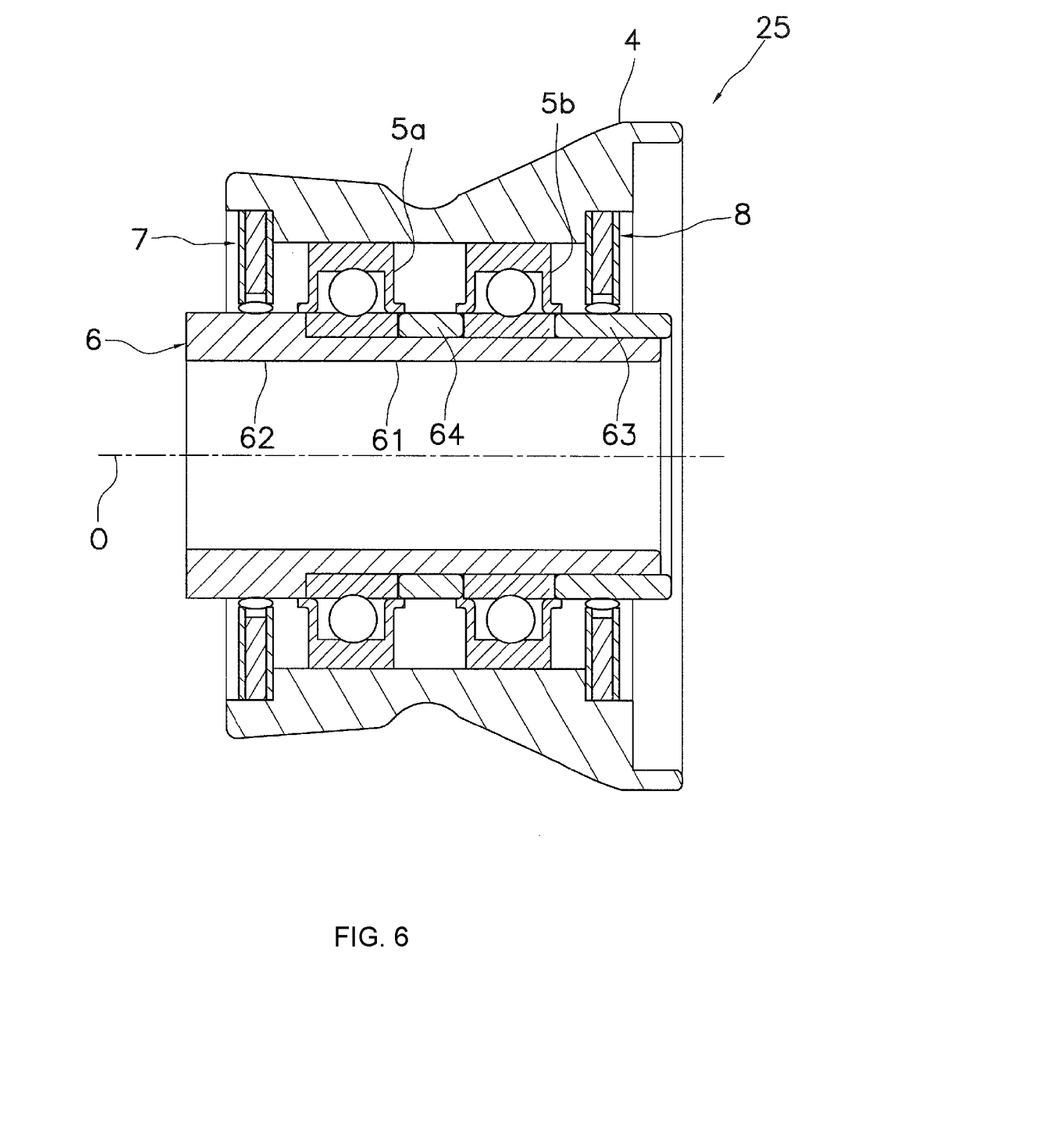
FIG. 6 is a sectional view of the line roller unit in connection with another embodiment of the present invention.

For example, bearing 5 can be configured using a plurality of bearings, or, more specifically, and as shown in FIG. 6, bearing 5 can have a first bearing 5*a* and a second bearing 5*b*, with first bearing 5*a* and second bearing 5*b* being configured at an interval and in a radial direction.

Cylindrical member 6 further possesses a third cylindrical part 64, with fourth cylindrical part 64 being configured between first bearing 5*a* and second bearing 5*b*. The fourth cylindrical part 64 is a member distinct from first cylindrical part 61 and second cylindrical part 62, with fourth cylindrical part 64 being configured on the periphery of first cylindrical part 61.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A line roller unit for a fishing line guide mechanism, the line roller unit comprising:
   a shaft member,
   a cylindrical member positioned on the shaft member, wherein the cylindrical member includes a holding unit defined thereon,
   a bearing, wherein at least a portion of the bearing is positioned in the holding unit,
   a line roller that includes a central opening defined therethrough, wherein the bearing is positioned within the central opening such that the line roller can rotate about the shaft member and the cylindrical member, and
   a first magnetic seal positioned within the central opening and between an inner diameter of the line roller and the cylindrical member, wherein the first magnetic seal includes a first magnet and a first holding member, wherein the first magnetic seal forms a first magnetic circuit for holding a first magnetic fluid positioned in a space between the cylindrical member and the first holding member.

2. The line roller unit of claim 1 wherein the cylindrical member includes a first cylindrical part having a first outer diameter that partially defines the holding unit and a second cylindrical part having a second outer diameter that is larger than the first outer diameter of the first cylindrical part, wherein the first and second cylindrical parts define a first step portion.

3. The line roller unit of claim 2 wherein the cylindrical member includes a third cylindrical part having a third outer diameter that is larger than the first outer diameter of the first cylindrical part, wherein the second and third cylindrical parts are positioned on opposite sides of the first cylindrical part, and wherein the first and third cylindrical parts define a second step portion.

4. The line roller unit of claim 3 wherein the bearing comprises an outer race, an inner race and a plurality of ball bearings positioned between the inner and outer races, wherein the inner race is positioned on the holding unit and between the first and second step portions.

5. The line roller unit of claim 4 wherein the first and second cylindrical parts are unitary, and wherein the third cylindrical art is not unitary with the first cylindrical part.

6. The line roller unit of claim 2 wherein the first magnetic circuit is formed between the second cylindrical part, the first magnet and the first holding member.

7. The line roller unit of claim 2 wherein the bearing comprises first and second bearings, wherein the cylindrical member further comprises a fourth cylindrical part positioned between the first and second bearings and on the first cylindrical part.

8. The line roller unit of claim 1 further comprising a second magnetic seal positioned within the central opening and between the inner diameter of the line roller and the cylindrical member, wherein the second magnetic seal includes a second magnet and a second holding member, wherein the second magnetic seal forms a second magnetic circuit for holding a second magnetic fluid positioned in a space between the cylindrical member and the second holding member.

9. The line roller unit of claim 8 wherein the inner diameter of the line roller includes first and second inner diameter portions with a third inner diameter portion positioned therebetween, wherein the third inner diameter portion has a smaller diameter than the first and second inner diameter portions, wherein the first magnetic seal is positioned between the first inner diameter portion and the cylindrical member and the second magnetic seal is positioned between the second inner diameter portion and the cylindrical member.

10. A line roller unit for a fishing line guide mechanism, the line roller unit comprising:
   a shaft member,
   a cylindrical member positioned on the shaft member, wherein the cylindrical member includes a holding unit defined therein, wherein the cylindrical member includes a first cylindrical part having an outer diameter that partially defines the holding unit, a second cylindrical part having an outer diameter that is larger than the outer diameter of the first cylindrical part, and a third cylindrical part having an outer diameter that is larger than the outer diameter of the first cylindrical part, wherein the first and second cylindrical parts define a first step portion, and wherein the first and third cylindrical parts define a second step portion
   a bearing that includes an outer race, an inner race and a plurality of ball bearings positioned between the inner and outer races, wherein the inner race is positioned in the holding unit and between the first and second step portions,
   a line roller that includes a central opening defined therethrough, wherein the bearing is positioned within the central opening such that the line roller can rotate about the shaft member and the cylindrical member,
   a first magnetic seal positioned within the central opening and between an inner diameter of the line roller and the cylindrical member, wherein the first magnetic seal includes a first magnet and a first holding member, wherein the first magnetic seal forms a first magnetic circuit for holding a first magnetic fluid positioned in a space between the second cylindrical part and the first holding member,
   a second magnetic seal positioned within the central opening and between the inner diameter of the line roller and the cylindrical member, wherein the second magnetic seal includes a second magnet and a second holding member, wherein the second magnetic seal forms a second magnetic circuit for holding a second magnetic fluid positioned in a space between the third cylindrical part and the second holding member
   wherein the inner diameter of the line roller includes first and second inner diameter portions with a third inner diameter portion positioned therebetween, wherein the third inner diameter portion has a smaller diameter than the first and second inner diameter portions, wherein the first magnetic seal is positioned between the first inner diameter portion and the second cylindrical part and the second magnetic seal is positioned between the second inner diameter portion and the third cylindrical part.

11. The line roller unit of claim 10 wherein the first and second cylindrical parts are unitary, and wherein the third cylindrical art is not unitary with the first cylindrical part.

12. A line roller unit for a fishing line guide mechanism that guides a fishing line to a spool of a spinning reel, the line roller unit comprising:
   a line roller,
   a bearing positioned on an inner circumferential surface of the line roller,
   a cylindrical member that has a holding unit for holding the bearing and that is positioned on an inner circumferential surface of the bearing, and
   a first magnetic seal that includes a first magnet and a first holding member that holds the first magnet, wherein the first magnetic seal forms a first magnetic circuit for holding a first magnetic fluid positioned in a space between the cylindrical member and the first holding member.

13. The line roller unit of claim 12 wherein the cylindrical member includes a first cylindrical part attached to the inner circumferential surface of the bearing and a second cylindrical part with an outer diameter larger than that of the first cylindrical part, and the holding unit that contains a first step portion defined by the first cylindrical part and the second cylindrical part, with the first step portion connected to a first side of the bearing.

14. The line roller unit of claim 13 wherein the cylindrical member further comprises a third cylindrical part that is configured on a periphery of the first cylindrical part, with the holding unit possessing a second step portion that is defined by the first cylindrical part and the third cylindrical part, with the second step portion being connected to a second side of the bearing.

15. The line roller unit of claim 14 wherein the bearing comprises an outer race configured to an inner circumference of the line roller, an inner race configured to a periphery of the cylindrical member, and a plurality of ball bearings configured in between the inner and outer races, with a first side of the inner race being connected to the first step portion.

16. The line roller unit of claim 14 wherein the bearing comprises an outer race configured to an inner circumference of the line roller, an inner race configured to a periphery of the cylindrical member, and a plurality of ball bearings configured between the inner and outer races, with a second side of the inner race being connected to the second step portion.

17. The line roller unit of claim 14 wherein the bearing comprises an outer race configured to an inner circumference of the line roller, an inner race configured to a periphery of the cylindrical member, and a plurality of ball bearings configured between the inner and outer races, with a first side of the inner race being connected to the first step portion and a second side of the inner race being connected to the second step portion.

18. The line roller unit of claim 13 wherein the first magnetic seal forms the first magnetic circuit between the second cylindrical part and the first holding member.

19. The line roller unit of claim 13 wherein the bearing further comprises first and second bearings, the cylindrical member further comprises a fourth cylindrical part between the first and second bearings that is configured to a periphery of the first cylindrical part.

20. The line roller unit of claim 12 further comprising a second magnetic seal that comprises a second magnet and a second holding member that maintains the second magnet, wherein the second magnetic seal forms a second magnetic circuit for holding a second magnetic fluid positioned in a space between the cylindrical member and the second holding member.

* * * * *